(12) United States Patent
Allgeier et al.

(10) Patent No.: US 10,922,307 B2
(45) Date of Patent: Feb. 16, 2021

(54) AUTOMATED TRANSACTION ENGINE

(71) Applicant: NextWorld LLC, Denver, CO (US)

(72) Inventors: Axel Allgeier, Parker, CO (US); Vito Solimene, Highlands Ranch, CO (US); David Allen Schneider, Aurora, CO (US); Deborah Gail Shupe, Centennial, CO (US)

(73) Assignee: NextWorld, LLC, Denver, CO (US)

( * ) Notice: Subject to any disclaimer, the term of this patent is extended or adjusted under 35 U.S.C. 154(b) by 72 days.

(21) Appl. No.: 15/949,397

(22) Filed: Apr. 10, 2018

(65) Prior Publication Data

US 2019/0179935 A1 Jun. 13, 2019

Related U.S. Application Data

(60) Provisional application No. 62/597,237, filed on Dec. 11, 2017.

(51) Int. Cl.
*G06F 16/00* (2019.01)
*G06F 16/23* (2019.01)
*G06F 11/14* (2006.01)

(52) U.S. Cl.
CPC ...... *G06F 16/2365* (2019.01); *G06F 11/1451* (2013.01); *G06F 11/1474* (2013.01); *G06F 16/2379* (2019.01); *G06F 2201/80* (2013.01); *G06F 2201/82* (2013.01); *G06F 2201/84* (2013.01)

(58) Field of Classification Search
CPC ............. G06F 16/2365; G06F 16/2379; G06F 11/1451; G06F 11/1474; G06F 2201/82; G06F 2201/80; G06F 2201/84; G06F 2201/87; G06F 11/302; G06F 11/3006

USPC ......................................................... 707/690
See application file for complete search history.

(56) References Cited

U.S. PATENT DOCUMENTS

| | | | |
|---|---|---|---|
| 6,947,956 B2 | 9/2005 | Olstad et al. | |
| 7,634,520 B1 | 12/2009 | Seiler et al. | |
| 7,774,356 B2 | 8/2010 | Cui | |
| 7,831,782 B1 | 11/2010 | Coulter et al. | |

(Continued)

OTHER PUBLICATIONS

International Search Report and Written Opinion issued in PCT Application No. PCT/US2018/064261 dated Feb. 6, 2019, 9 pages.

*Primary Examiner* — Thanh-Ha Dang (57) ABSTRACT

Various embodiments of the present technology generally relate to automated tools for tracking, recording, restoring and auditing transactions. In accordance with various embodiments, applications and servers can provide a variety of features including, but not limited to, behind the scene monitoring activity (transaction or business) and recording, persisting client activity, ubiquitous autosave, business workflow and approval lifecycles, error correction at the business level, management of the state of the transaction without the user having to manage the activity, tracking posted and unposted transactions (e.g., business state), and the like. The applications can communicate with a unified transaction engine that combines awareness of database transaction state along with business transaction states. As a result, the end-user and/or developer do not have to be concerned about the underlying differences between the database transaction state and business transaction states, and can focus on where their transaction is in its lifecycle.

18 Claims, 7 Drawing Sheets

(56) References Cited

U.S. PATENT DOCUMENTS

| | | |
|---|---|---|
| 7,836,031 B2 | 11/2010 | Howard et al. |
| 8,332,349 B1 | 12/2012 | Wilson |
| 8,504,542 B2 | 8/2013 | Chang et al. |
| 8,826,273 B1 | 9/2014 | Chen |
| 9,069,704 B2 | 6/2015 | Schreter |
| 9,400,719 B2 | 7/2016 | Campbell et al. |
| 9,417,977 B2 | 8/2016 | Walter et al. |
| 9,727,357 B2 | 8/2017 | Jacobs et al. |
| 2007/0174695 A1 | 7/2007 | Varadarajan et al. |
| 2008/0016111 A1* | 1/2008 | Keen .................. G06F 19/321 |
| 2008/0134211 A1 | 6/2008 | Cui |
| 2008/0250074 A1 | 10/2008 | Parkinson |
| 2008/0250272 A1 | 10/2008 | Barnes et al. |
| 2009/0217274 A1 | 8/2009 | Corbin et al. |
| 2010/0169284 A1* | 7/2010 | Walter ................ G06F 11/1474 707/682 |
| 2010/0281458 A1 | 11/2010 | Paladino et al. |
| 2013/0085996 A1 | 4/2013 | Tian et al. |
| 2013/0339302 A1* | 12/2013 | Zhang ................ G06F 11/1451 707/649 |
| 2016/0062852 A1 | 3/2016 | Maple et al. |
| 2017/0109394 A1 | 4/2017 | Chang et al. |

\* cited by examiner

AUTOMATED TRANSACTION ENGINE

CROSS-REFERENCE TO RELATED APPLICATIONS

This application claims priority to U.S. Provisional Application Ser. No. 62/597,237 filed Dec. 11, 2017, which is incorporated herein by reference in its entirety for all purposes.

BACKGROUND

Modern electronic devices such as computers, tablets, mobile phones, wearable devices and the like have become a common part of modern life. Many users of electronic devices routinely utilize various types of software applications for business and personal activities. Many business use customized software to assist users in creating customized transactions (e.g., creating a customized parts list), managing orders, ensuring workflows are followed, tracking shipments, and the like. These software applications can also be used to perform specific calculations, produce charts, organize data, and the like. Moreover, there are a variety of channels for delivering software and services to end-users including cloud computing services software as a service (SaaS), platform as a service (PaaS), and the like.

The software applications can create various transactional entries within databases. Many traditional systems seek to ensure that a transaction will comply with an ACID (Atomicity, Consistency, Isolation, and Durability) transaction model. Atomicity requires that each transaction be captured as an atomic unit (e.g., the transaction is wholly captured or nothing is capture at all) even in view of system failures and power outages. Accordingly, a database entry is left unmodified if any part of the transaction fails for any reason. Consistency means that any transaction results in a transition from one valid state to another within the database. Concurrent execution of transactions results in a system state that would be obtained if transactions were executed sequentially (e.g., one after the other) is ensured by isolation. Finally, durability ensures that once a transaction has been committed, the transaction will remain even in the event of power loss, crashes, or errors. For example, once a group of SQL statements execute, the results need to be stored permanently even if the database crashes.

Unfortunately, these traditional systems often process data in a way that creates server affinity. Moreover, these traditional systems typically create large sets of disjoint transactions that are really part of a single business flow. For example, creation of a customized parts list may be considered as one transaction while order fulfillment may be considered completely separately. In addition, users of the software application often have to perform specific actions in order for a current state of the transaction to be persisted to the database. As a result, when various system failures occur, there is a potential loss of work if the user has not recently requested the data be saved.

SUMMARY

Various embodiments of the present technology generally relate to automated tools for tracking, recording, restoring, and auditing transactions. Some embodiments provide for an automated transaction system that is always on capturing activity on client devices. The automated transaction system can have one or more processors, a memory, communications component, a transaction engine, a database, an audit engine, and/or a metadata-driven boundary detector. The communications component can be configured to receive activity snapshots identifying changes to a transactional entry being modified in an application running on a client device. The activity snapshots can be automatically created in response to triggering events (e.g., expiration of timers, reaching logical transaction boundaries, detection of metadata defined trigger points, crossing of metadata boundaries such as a screen change, or the like). In some embodiments, the activity snapshots may only identify changes to the transactional entry since a previous activity snapshot. The activity snapshots can be a series of transient records representing a series of changes to the transactional entry to return the transactional entry from a current state to a previous state.

The transaction engine can be configured to create transient records that link the activity snapshots received from the client device to a transaction. In some embodiments, the transaction engine can use business logic to associate a workflow state to each of the activity snapshots. The transaction engine can also assign transaction identifiers to each of the activity snapshots. The database can store the transient records and any traditional transaction records. The audit engine can be configured to access the transient records stored in the database and create, based on the business logic, an audit trail identifying workflow activity. The metadata-driven boundary detector can analyze the transient records for a boundary identified by the business logic and create a persistent record within the database. In some embodiments, the metadata-driven boundary detector can create the persistent record based on the transient records and then remove the transient records from the database.

Embodiments of the present invention also include computer-readable storage media containing sets of instructions to cause one or more processors to perform the methods, variations of the methods, and other operations described herein.

Some embodiments include a method that comprises receiving, from an application running on a client device, activity snapshots identifying changes to a transaction being modified in the application. The activity snapshots can be automatically created in response to triggering events according to various embodiments. The activity snapshots may identify only the changes to the transaction that have occurred since a previous activity snapshot and may also include client session information, zone information, time stamps, user identifiers, and the like. In some embodiments, the activity snapshots can be linked to an automated transaction record. The linking of the activity snapshots to the automated transaction record may include assigning a transaction identifier to the activity snapshots.

In some embodiments, a request to restore the transaction to a previous state can be received. The request to restore the transaction to the previous state can automatically generated upon detection of a failure within the system that could have resulted in a loss of data. In response to receiving the request to restore, the activity snapshots associated with the automated transaction record can be processed to create the previous state of the transaction. Some embodiments process the activity snapshots by identifying a subset of transactional data that will return the automated transaction record to the previous state and then transmitting from a server to the client device, the subset of the transactional data to the application. Some data may be combined or removed based on the processing.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to automated tools for tracking, recording, restoring, and auditing transactions. Traditional systems often use a click and save model to record transactions. As such, work can easily be lost if a user has not performed a specific action requesting a save of activity within an application. In contrast, various embodiments of the present technology automatically record all (or substantially all) activity from a first key stroke of a transaction all the way until the transaction is dead (e.g., sales order has been shipped and paid). Moreover, instead of recording events within the transaction as separate sets of disjoint transactions (e.g., transaction creation, order fulfillment, order shipment, etc.), various embodiments use business logic to identify transaction boundaries and effectively create a single transaction with multiple states.

Various embodiments of the present technology encompass more than traditional transactions and includes additional characteristics such as workflow, audit, client session management, transient work, and other characteristics. As a result, from a first key click or first interaction, if a part of the system fails, any information about the current state is recorded resulting in a system that is lossless, stateless, scalable (e.g., horizontally scalable), multistate (e.g., business state, contextual state, etc.), auditable (e.g., contextual audit), and the like.

Various embodiments of the present technology provide for a wide range of technical effects, advantages, and/or improvements to computing systems, components, and applications. For example, various embodiments include one or more of the following technical effects, advantages, and/or improvements: 1) provide unique tools that link all activity within a transaction boundary; 2) creation of a unique signaling protocol between a client device and server to automatically record session activity; 3) utilization of transient activity records that identify successive changes within a client session to a server resulting in a reduction of server memory; 4) system interactions allowing any server to instantly pick up a client session (i.e., no server affinity); 5) use unconventional and non-routine operations as part of creating, updating, and monitoring custom software applications; 6) unique systems and methods that allow behind the scene monitoring and recoding of activity (e.g., transactional activity or business activity); 7) persisting of client activity; 8) ubiquitous auto save; 9) management of business workflow lifecycles; 9) managing the state of the transaction without the user having to manage the activity; and/or 10) transaction auditing. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to various computing architectures, embodiments of the present technology are equally applicable to various other cloud-based and distributed processing techniques.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
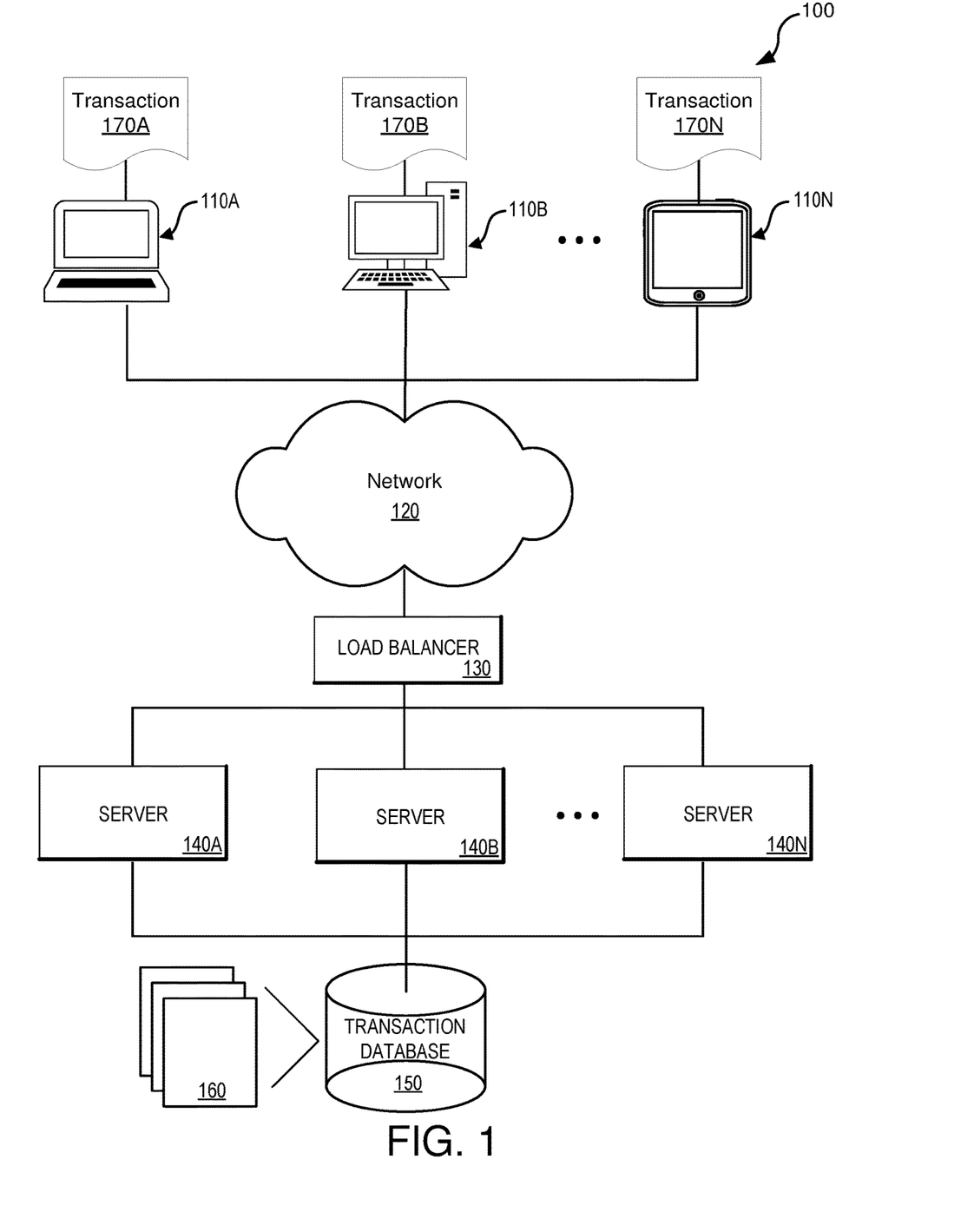
FIG. 1 illustrates an example of an operating environment in which some embodiments of the present technology may be utilized.

FIG. 1 illustrates an example of an operating environment 100 in which some embodiments of the present technology may be utilized. As illustrated in FIG. 1, operating environment 100 may include one or more applications running on client devices 110A-110N (e.g., a mobile phone, tablet computer, mobile media device, mobile gaming device, vehicle-based computer, wearable computing device, etc.), network 120, load balancers 130, servers 140A-140N, and transaction databases 150 having entries 160 created in response to transaction 170A-170N. Applications accessed via client devices 110A-110N can be large scale enterprise application capable of performing large scale complex transactions in a stateless manner. As such, these large scale complex transactions can be instantly handed off and/or picked up by another server for any reason (e.g., load balancing, server failures, etc.).

In accordance with various embodiments, client devices 110A-110N can include a variety of network communication components that enable client devices 110A-110N to communicate with remote servers 140A-140N or other portable electronic devices by transmitting and receiving wireless signals using licensed, semi-licensed or unlicensed spectrum over a communications network. In some cases, the communications network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. In accordance with various embodiments, load balancers 130 can run in a stateless mode so that any client session or client device has no affinity to a particular server 140A-140N. This lack of server affinity is the result, at least in part, of the unique signaling protocol between client devices 110A-110N and remote servers 140A-140N used in various embodiments to automatically record session activity.

Servers 140A-140N can host applications which can be accessed via client devices 110A-110N. In accordance with various embodiments, these applications and servers can provide a variety of features including, but not limited to, behind the scene monitoring activity (transaction or business) and recording, persisting client activity, ubiquitous autosave, business workflow and approval lifecycles, error correction at the business level, management of the state of the transaction without the user having to manage the activity, tracking posted and unposted transactions (e.g., business state), and the like. The applications can communicate with a unified transaction engine that combines awareness of database transaction state along with business transaction states. As a result, the end-user and/or developer do not have to be concerned about the underlying differences between the database transaction state and business transaction states, and can focus on where their transaction is in its lifecycle. As users interact with the application, the system can monitor, track, and/or record the states and other transactional data in transaction database 150.

Various embodiments of the present technology allow changes to transactions 160A-160B to be identified and sent in repeated multiple small snapshots. As a result of sending the changes more frequently to a server 140A-140N, the server memory can be reduced and any server can immediately pick up the activity (i.e., there is no server affinity). The small snapshots of the changes or transient activity can be sent upon triggering events (e.g., time, metadata boundary detection, screen change, logical transaction boundary, and change detection). For example, as a user changes from one screen to another (e.g., a user crosses metadata boundary), a snapshot may be captured. In addition, in some embodiments, the snapshots may be capture without any user-based triggers. For example, snapshots may be captured asynchronously in the background can be tracked and recorded and ultimately recovered if needed.

In some embodiments, the snapshots may include more than just the data and changes to the data but may also capture information about how the data is being presented. For example, is the data being presented in column format or table for sorting. Similarly, addition characteristics about the user interface can be captured by the snapshots and ultimately restored. For example, the current state of the tabs (e.g., placement, expanded, not expanded, color preferences, window placement, configurations, etc.) can be captured. As a result, user activity can be tracked without any explicit event and ubiquitous auditing features are available through the persistence of records of transaction boundary. The transaction boundaries can be detected using metadata regarding the application workflow and creates an awareness to where the transaction is within the workflow.

Figure 2:
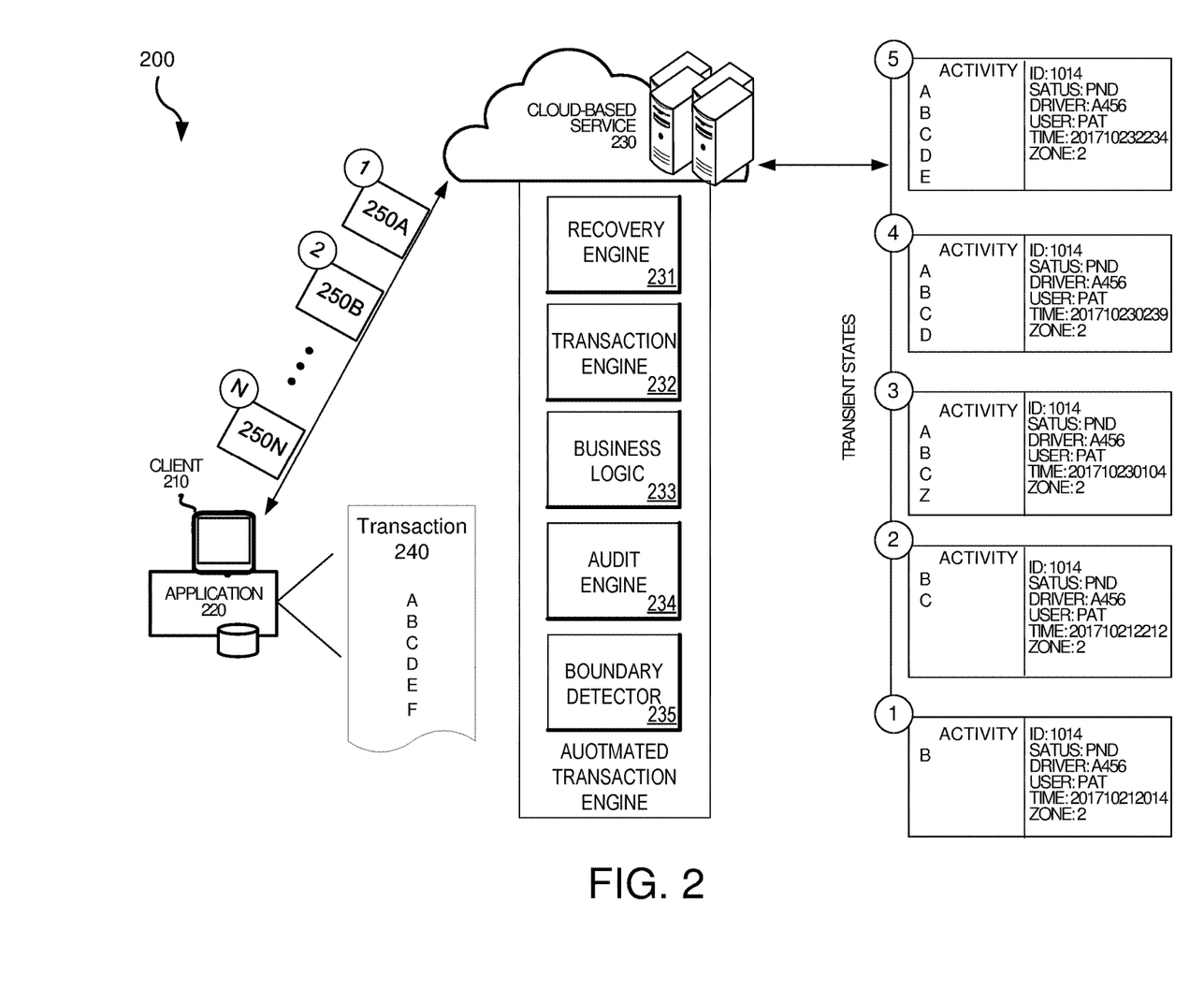
FIG. 2 illustrates a set of components that may be used to create automated transaction records according to one or more embodiments of the present technology.

FIG. 2 illustrates a set of components that may be used to create automated transaction records according to one or more embodiments of the present technology. As illustrated in FIG. 2, client device 210 can run one or more applications 220 (e.g., customized enterprise applications, word processing applications, e-mail applications, spreadsheet applications, etc.) that can store electronic records in a cloud-based service 230. Service 230 can be representative of any service providing shared access to cloud-based or centralized applications, communication, content, and centralized storage. Service 230 can include an automated transaction engine that is capable of seamlessly saving client activity in the background in a transient state (AUTOSAVE).

As shown in FIG. 2, a user can be creating transaction 240 on application 220. To facilitate transaction creation and editing, application 220 can include a variety of functionality including GUIs (graphical user interface) running on client device 210, e.g., a PC, mobile phone device, a Web server, or other application servers. Such systems may employ one or more virtual machines, containers, or any other type of virtual computing resource. As a user interacts with application 220, activity snapshots 250 can be created representative of recent activity associated with transaction 240. Activity snapshots 250 can be transmitted to cloud-based service 230 that includes an automated recovery engine.

The automated recovery engine can include various components such as, but not limited to recovery engine 231, transaction engine 232, business logic 233, audit engine 234, and boundary detector 235. Each of these components or modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

While not shown in FIG. 2, some embodiments may include memory that can be any device, mechanism, or populated data structure used for storing information. In accordance with some embodiments of the present technology, the memory can encompass any type of, but is not limited to, volatile memory, nonvolatile memory and dynamic memory. For example, the memory can be random access memory, memory storage devices, optical memory devices, media magnetic media, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory.

Moreover, the memory may be used to store instructions for running one or more applications or modules on one or more processor(s) (not shown). For example, the memory could be used in one or more embodiments to house all or some of the instructions needed to execute the functionality of recovery engine 231, transaction engine 232, business logic 233, audit engine 234, and/or boundary detector 235. As activity snapshots 250A-250N are received, the automated transaction engine can monitor, track, and/or record the snapshots. The automated transaction engine provides a unified transaction engine 232 that links technical transaction states and business transaction states using business logic 233. The number of automated transaction engines may dynamically scale, expand or contract based on volume, timing, and the like.

The transactions monitored by the automated transaction engine can include anything that touches data or involves some type of business transaction. In some embodiments, the automated transaction engine can link technical transaction states (e.g., data access) with business transaction states (e.g., workflow). In some embodiments, the transactions and user interactions with the applications are tracked and can be restored within an application as needed using recovery engine 231. This can provide not only auto save type features to each application, whether specified by the domain expert or not while using the application design tool. In addition, this type of tracking can be used for versioning and rolling back data. Still yet, since all transactions from one or more applications can be monitored and/or recorded by the automated transaction engine, the automated transaction engine can create logs for various types of audits with audit engine 234.

In some embodiments, the automated transaction engine can identify steps within the workflow and accordingly tag and associate the identified workflow step as part of the transaction data. For example, as if the transaction includes an order placement, the automated transaction engine can monitor the order placement though a lifecycle (e.g., pending, approved, shipped, error, etc.). Using boundary detector 235, automated transaction engine can determine different boundaries (e.g., beginning, end, etc.) of a transaction. Using transaction engine 232, business logic 233, and/or boundary detector 235, service 230 can create and store transient states (e.g., shadow entries) with a transaction. In addition, to automated capture of the transient states, a user may request that a restore or replay point be created. Upon receiving this request, service 230 can create restore or replay points. In some embodiments, the transient states created before or after the request can be added to the replay point and processed to show the editing activity during replay mode on the client device.

Figure 3:
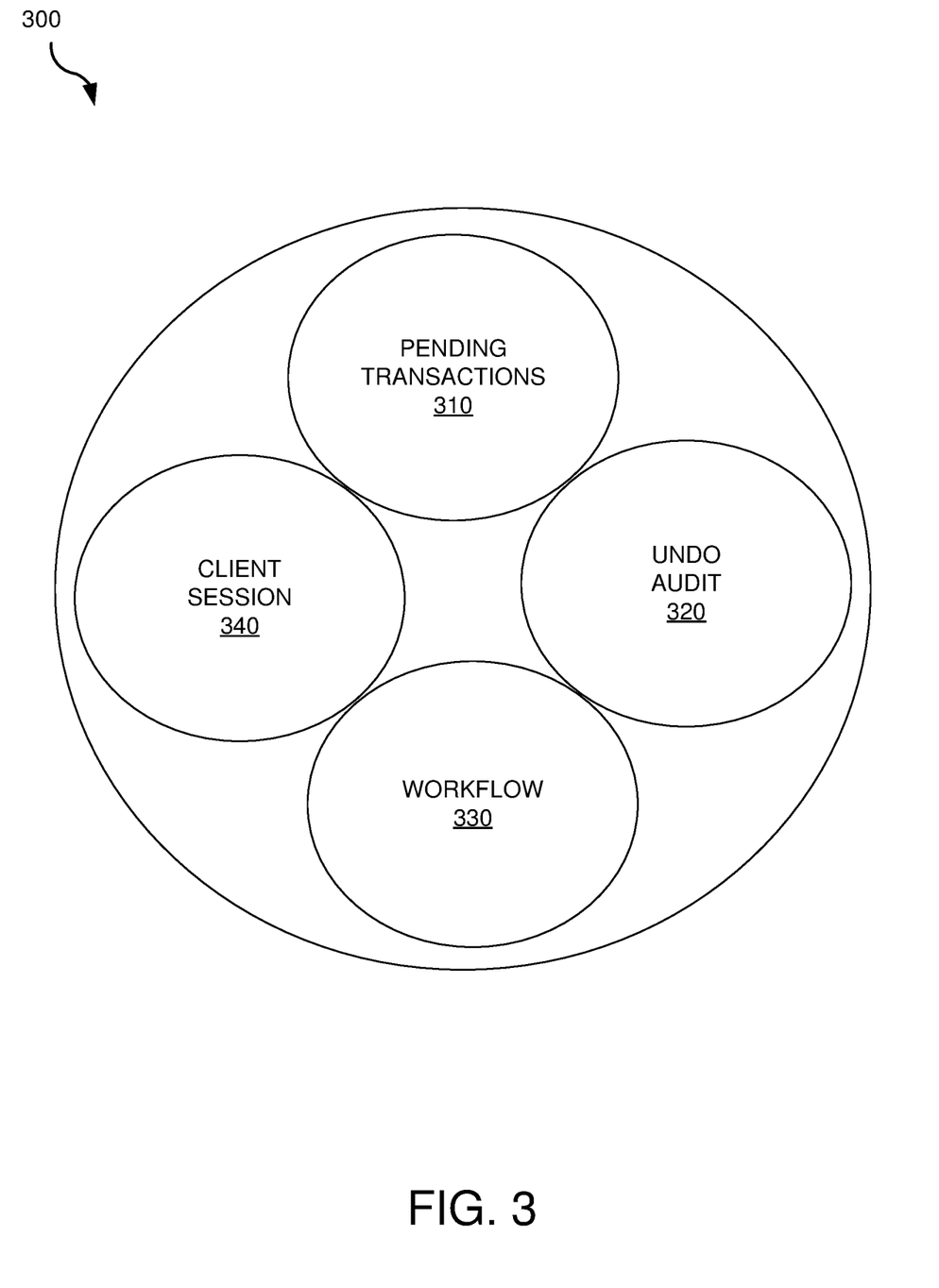
FIG. 3 illustrates logical components of an automated transaction engine according to various embodiments of the present technology.

FIG. 3 illustrates logical components of an automated transaction engine according to various embodiments of the present technology. As illustrated in FIG. 3, the automated transaction engine can track pending transactions 310, provide undo audits 320, associate the transactions with workflow 330 or other business data, and track client sessions. The automated transaction engine provides an expanded transaction boundary to include more than just a click and save. In accordance with various embodiments, the automated transaction engine can capture explicit and implicit activity to create the transaction. For example, a large complex sales order can require a user to enter or create hundreds or thousands of lines.

Traditionally, servers can track everything in the memory of the server. When the user clicks save, the system talks to the database and transfers a record from the memory to the database. With large transactions (e.g., sales orders, inventory, etc.), the system cannot transfer the record in a single chunk. By sending multiple transient snapshots or creating shadow transactions, the system will be able to continually update, record, or at least track the record even without user requesting it be saved. Once a user requests the activity be saved or a boundary is automatically detected, the transient snapshots, states, or shadow transactions can be used to create the permanent record. In some cases, the activity snapshots may only persist until expiration, are expressly deleted after events (e.g., manual saves), etc.

Figure 4:
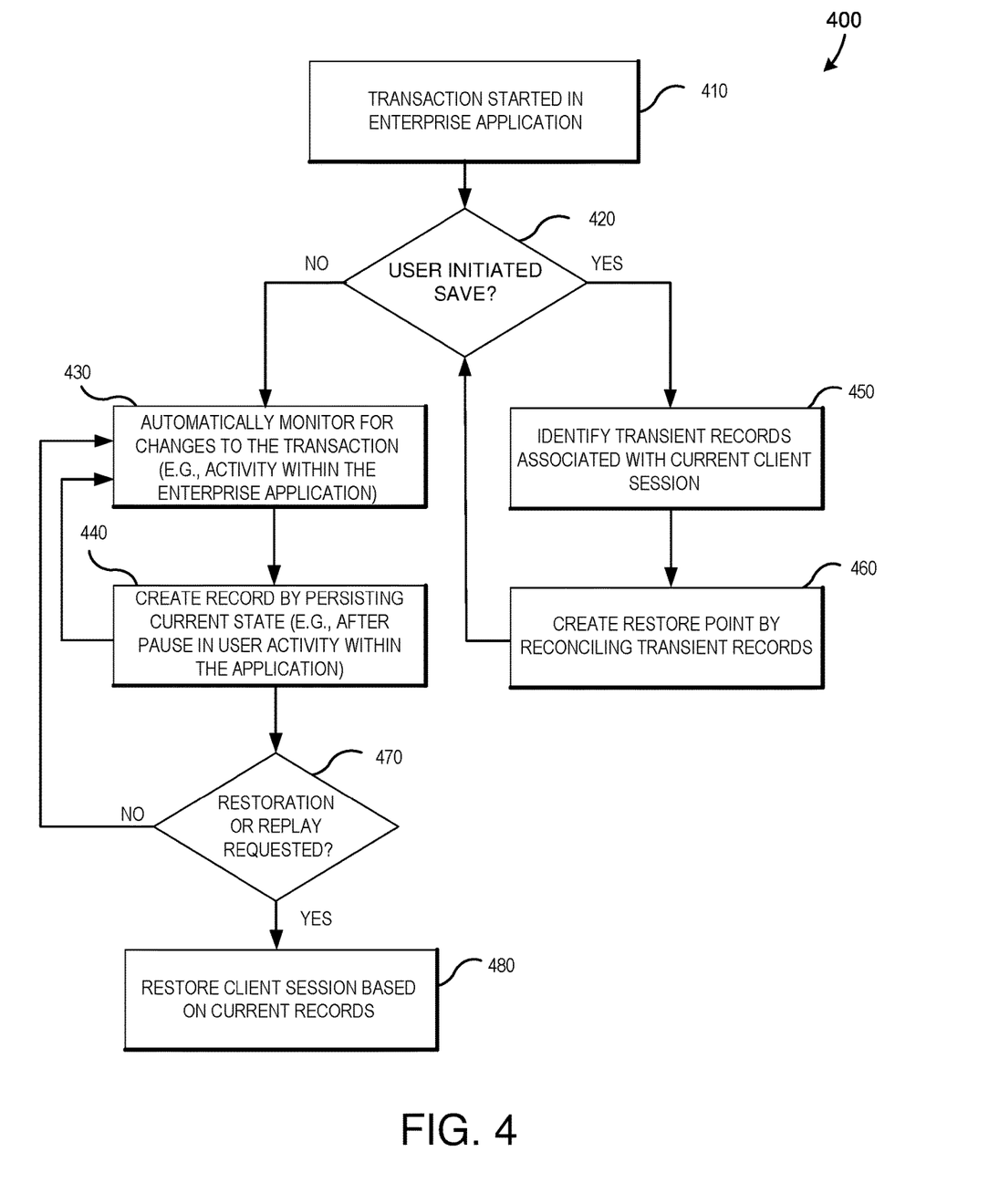
FIG. 4 is a flowchart illustrating a set of operations for restoring a transaction record according to one or more embodiments of the present technology.

FIG. 4 is a flowchart illustrating a set of operations 400 for restoring a transaction record according to one or more embodiments of the present technology. As illustrated in FIG. 4, creation operation 410 allows a user to create a new transaction record (e.g., a sales record) or continue editing an existing transaction record via an application on a client device. Determination operation 420 can determine whether a user has specifically requested that the current state be saved (e.g., request to create a replay point or a restore point). When determination operation 420 determines that a specific request has not been made, determination operation 420 branches to monitoring operation 430 which monitors for changes to the transaction and/or any activity within the application.

As changes are identified by monitoring operation 430, recordation operation 440 creates a transient transactional record identifying the changes and/or interactions made by the user within the application. These transient transactional records may only identify changes to the transaction record that have occurred since the previous transient record was sent. As such, these transient transactional records are typically small and can be efficiently communicated to a server which can stored them in a database. These small frequent communications with the server regarding the current state create a unique conversation or communication protocol between the client session and the server.

These transactional records can be assigned an automated transaction identifier that includes at least a common portion to associate the transient transactional records with the transaction. The automated transaction identifier may also be used to quickly identify that the record is a shadow of a larger transaction. The record may also include a status indicator identifying whether the record has an autosave pending or has been recovered, a table driver identifier, a user identifier, a time stamp, a zone identifier, sequence number, data for the driver, operational activity (e.g., update, delete, insert), and the like. The record can be persisted with recordation operation 440. During this time the user may have made additional changes which can be detected by monitoring operation 430 creating a loop of activity detection and record creation.

When determination operation 420 determines that a specific request has been made, determination operation 420 branches to identification operation 450 which identifies some or all of the transient records associated with the current client session. For example, if a previous restore or replay point is available, then identification operation 450 may only retrieve transient records that are dated/time stamped after the previous restore point. By processing the transient records, and previous restore point if available, creation operation 460 can create a new restore point by reconciling the transient records. For example, a user may add text and then delete the same text. As such, the reconciliation process identifies that the text was later added and then deleted and should not be present in the restore point. Creation operation 460 can then branch to determination operation 420 and/or monitoring operation 430.

Restoration determination operation 470 can determine when a restoration or replay has been requested. This request may be generated by the user, client device, application, or other system. For example, when a failure has occurred a request to restore may be automatically generated. When restoration determination operation 470 determines that no request has been received, restoration determination operation 470 branches back to monitoring operation 430. When restoration determination operation 470 determines that a request has been made, restoration determination operation 470 branches to restoration operation 480 where client session is restored.

In some embodiments, restoration operation 480 can identify the transaction on the client device and retrieve the latest full save initiated by the user. Restoration operation 480 can then retrieve the series of shadow or transient transactional records that were automatically created by the system. This can be done, for example, by using the timestamps in the record to retrieve and/or sort the shadow transactions that have occurred since the full save. From the full transaction each addition, deletion or modification identified in the shadow transactions can be processed and entered. In accordance with various embodiments, restoration operation 480 can be done on the client device or on a sever.

Figure 5:
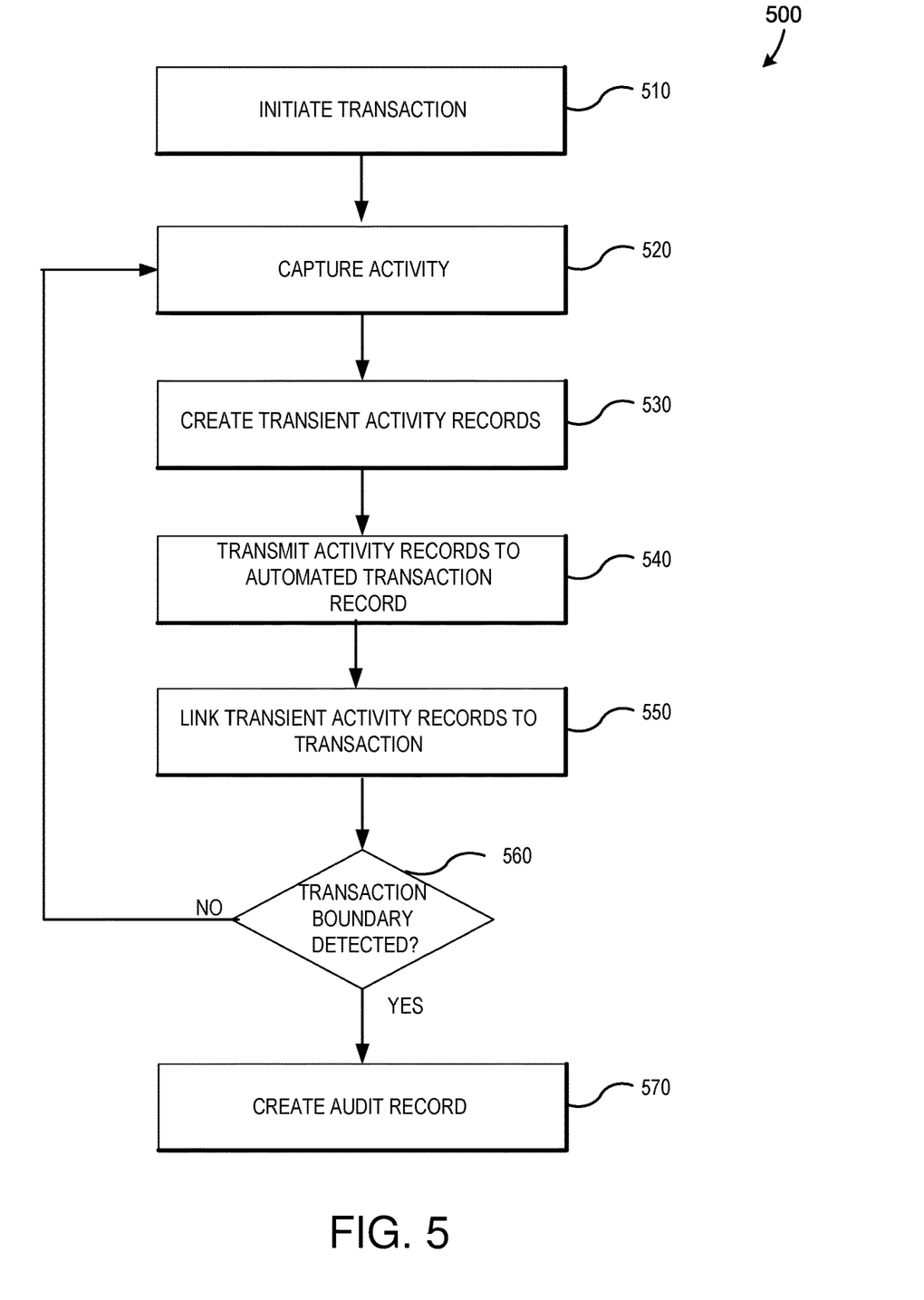
FIG. 5 is a flowchart illustrating a set of operations for creating an audit record according to one or more embodiments of the present technology.

FIG. 5 is a flowchart illustrating a set of operations 500 for creating an audit record according to one or more embodiments of the present technology. As illustrated in FIG. 5, initiation operation 510 initiates a transaction monitoring processes within the automated transaction engine. Recordation operation 520 captures activity (e.g., additions, deletions, changes, etc.) to a transactional record. Creation operation 530 creates snapshots of transient activity (e.g., shadow transactional records, incremental transient records identifying only changes from since previous snapshots, etc.) where the user has not requested the current state be saved. Creation operation 530 can result from various triggers such as expiration of timers, volume of changes, particular user activity, particular sets of changes, logical transaction boundaries, metadata defined trigger points, boundary detection (e.g., change screen), and the like. Once created, transmission operation 540 can transmit the activity record from a client device to a cloud-based automated transaction engine.

Once the activity record is received at the automated transaction engine, linking operation 550 can link the transient activity record to a transaction. Determination operation 560 can determine if a transaction boundary has been reached. When determination operation 560 determines that no transactional boundary has been reach, determination operation 560 branches to recordation operation 520 where additional activity is captured. When determination operation 560 determines that a transactional boundary has been reach, determination operation 560 branches to audit creation operation 570 where an audit record is created identifying transient activity as well as requested transaction records.

Figure 6:
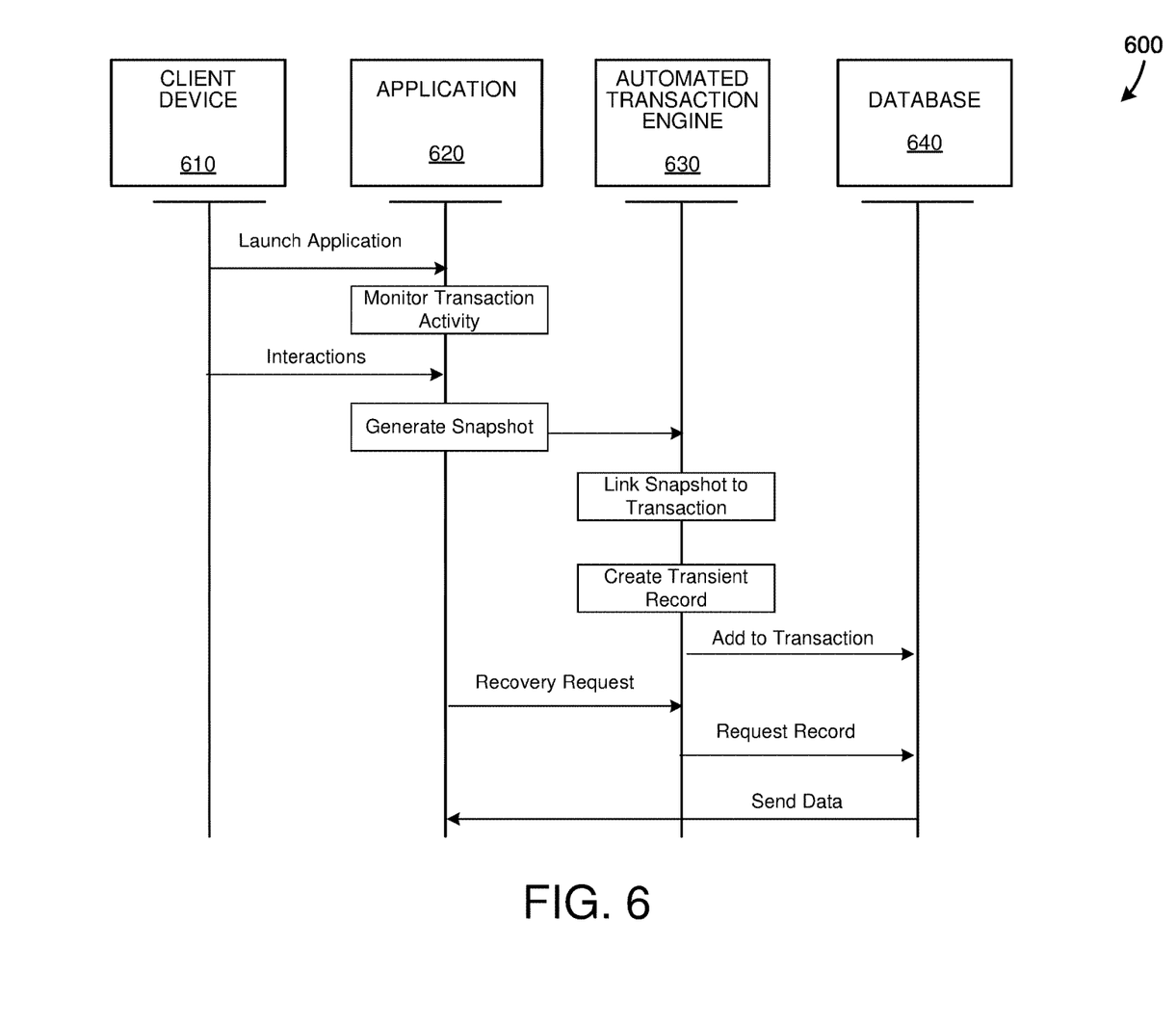
FIG. 6 is a sequence diagram illustrating an example of communications between various components of a system with an automated transaction engine according to various embodiments of the present technology.

FIG. 6 is a sequence diagram illustrating an example of communications between various components of a system with an automated transaction engine according to various embodiments of the present technology. As illustrated in FIG. 6, client device 610 can launch application 620 which allows user to create and/or modify transactional records. Application 620 can be hosted in the cloud (e.g., on one or more servers) or pushed to client devices 610 for access by a user. As a user interacts with application 620, activity is reported to automated transaction engine 630 which can persist the activity within the application. As a result, if application 620 crashes, the hosting computer loses power, or some other event occurs, then application 620 can request state data from automated transaction engine 630. In response, automated transaction engine 650 can transmit the state data to application 620 which can return application 620 to the last know state before the failure occurred.

As a result, various embodiments of automated transaction engine 650 provide one or more of the following benefits: 1) work can never be lost—even if a browser client crashes—work is seamlessly saved in the background in a transient state (AUTOSAVE); 2) all business data errors are tracked and the transactions in error can be corrected and resubmitted; 3) any system errors are also tracked and can be similarly recovered—regardless of availability of two phase commit by underlying engine processing transaction; 4) workflow is integrated by managing the state of any transactions; 5) other business state (posted/unposted) is similarly tracked (as part of the workflow system); 6) an audit trail is retained for all state changes; and/or 7) Given the appropriate permissions any transaction or change can be undone or rolled back.

Exemplary Computer System Overview

Figure 7:
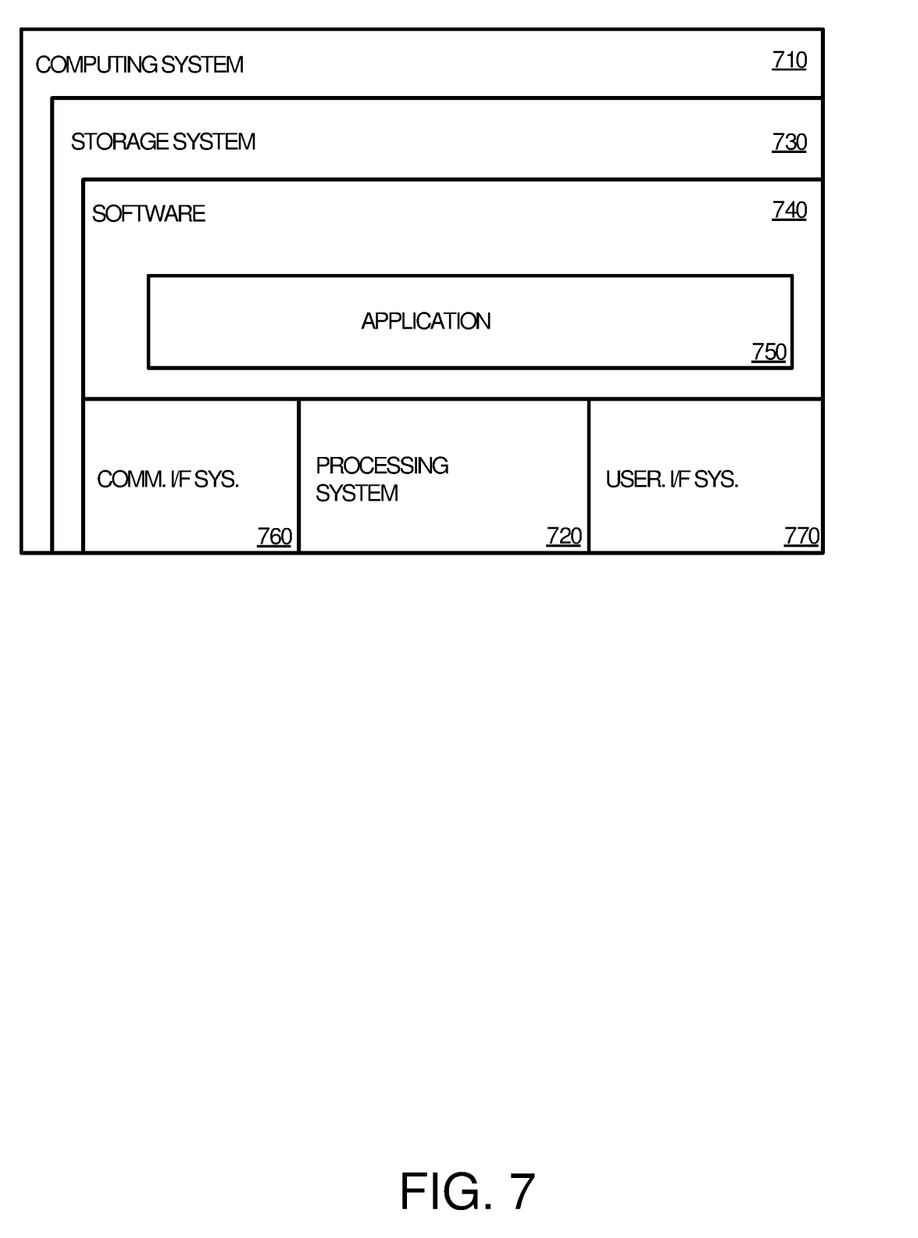
FIG. 7 illustrates an example of a computing system, which is representative of any system or collection of systems in which the various applications, services, scenarios, and processes disclosed herein may be implemented.

FIG. 7 illustrates computing system 710, which is representative of any system or collection of systems in which the various applications, services, scenarios, and processes disclosed herein may be implemented. For example, computing system 710 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 710 may be implemented as a single apparatus, system, or device or may be implemented in a distributed manner as multiple apparatuses, systems, or devices. Computing system 710 includes, but is not limited to, processing system 720, storage system 730, software 740, applications 750, communication interface system 760, and user interface system 770. Processing system 720 is operatively coupled with storage system 730, communication interface system 760, and an optional user interface system 770.

Processing system 720 loads and executes software 740 from storage system 730. When executed by processing system 720 for deployment of scope-based certificates in multi-tenant cloud-based content and collaboration environments, software 740 directs processing system 720 to operate as described herein for at least the various processes, operational scenarios, and sequences discussed in the foregoing implementations. Computing system 710 may optionally include additional devices, features, or functionality not discussed for purposes of brevity.

Referring still to FIG. 7, processing system 720 may comprise a micro-processor and other circuitry that retrieves and executes software 740 from storage system 730. Processing system 720 may be implemented within a single processing device, but may also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 may comprise any computer readable storage media readable by processing system 720 and capable of storing software 740. Storage system 730 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 730 may also include computer readable communication media over which at least some of software 740 may be communicated internally or externally. Storage system 730 may be implemented as a single storage device, but may also be implemented across multiple storage devices or sub-systems co-located or distributed relative to each other. Storage system 730 may comprise additional elements, such as a controller, capable of communicating with processing system 720 or possibly other systems.

Software 740 may be implemented in program instructions and among other functions may, when executed by processing system 720, direct processing system 720 to operate as described with respect to the various operational scenarios, sequences, and processes illustrated herein. For example, software 740 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or application software. Software 740 may also comprise firmware or some other form of machine-readable processing instructions executable by processing system 720.

In general, software 740 may, when loaded into processing system 720 and executed, transform a suitable apparatus, system, or device (of which computing system 710 is representative) overall from a general-purpose computing system into a special-purpose computing system. Indeed, encoding software on storage system 730 may transform the physical structure of storage system 730. The specific transformation of the physical structure may depend on various factors in different implementations of this description. Examples of such factors may include, but are not limited to, the technology used to implement the storage media of storage system 730 and whether the computer-storage media are characterized as primary or secondary storage, as well as other factors.

For example, if the computer readable storage media are implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 760 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 770 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 770. In some cases, the input and output devices may be combined in a single device, such as a display capable of displaying images and receiving touch gestures. The aforementioned user input and output devices are well known in the art and need not be discussed at length here. In some cases, the user interface system 770 may be omitted when the computing system 710 is implemented as one or more server computers such as, for example, blade servers, rack servers, or any other type of computing server system (or collection thereof).

User interface system 770 may also include associated user interface software executable by processing system 720 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 710 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A system comprising:
   one or more computer readable storage media;
   a processing system operatively coupled with the one or more computer readable storage media; and
   program instructions stored on the one or more computer readable storage media for operating an automated transaction engine, wherein the program instructions, when read and executed by the processing system, direct the processing system to at least:
   in a transaction engine, receive an activity snapshot from an application running on a client device, wherein the application monitors transaction activity on the client device and generates activity snapshots of the transaction activity in response to triggering events;
   in the transaction engine, assign a transaction identifier to the activity snapshot identifying a transaction to which the activity snapshot pertains;
   in the transaction engine, associate the activity snapshot with a workflow state of the transaction using business logic; and
   in the transaction engine, generate a transient record that links the activity snapshot and the workflow state to the transaction;

wherein the triggering events include one or more of an expiration of a time interval, a logical transaction boundary, a metadata defined trigger point, and a metadata boundary.

2. The system of claim 1, wherein the program instructions further direct the processing system to, in response to a request from the application running on the client device, process transient records representing a series of changes to the transaction and return the transaction from a current state to a previous state.

3. The system of claim 1, wherein the activity snapshot only identifies changes to the transaction since a previous activity snapshot.

4. The system of claim 1, wherein the program instructions further direct the processing system to:
 access transient records stored in a database; and
 create, based on the business logic, an audit trail identifying workflow activity.

5. The system of claim 1, wherein the program instructions further direct the processing system to analyze transient records for transaction boundaries, identify a transaction boundary using the business logic, and, in response to identification of the transaction boundary, automatically create a persistent record of the transaction within a database.

6. The system of claim 5, wherein the persistent record is created based on transient records for the transaction and wherein the program instructions further direct the processing system to remove the transient records from the database.

7. A method comprising:
 receiving, in a transaction engine, an activity snapshot from an application running on a client device, wherein the application monitors transaction activity on the client device and generates activity snapshots of the transaction activity in response to triggering events;
 assigning, in the transaction engine, a transaction identifier to the activity snapshot identifying a transaction to which the activity snapshot pertains;
 associating, in the transaction engine, the activity snapshot with a workflow state of the transaction using business logic;
 generating, in the transaction engine, a transient record that links the activity snapshot and the workflow state to the transaction; and
 storing the transient record with a transaction record associated with the transaction;
 wherein the triggering events include one or more of an expiration of a time interval, a logical transaction boundary, a metadata defined trigger point, and a metadata boundary.

8. The method of claim 7, further comprising, in a recovery engine, returning a series of transient records representing a series of changes to the transaction in response to a request to restore the application running on the client device to a previous state.

9. The method of claim 7, wherein the activity snapshot identifies a user of the application and a client session.

10. The method of claim 7, wherein the application is one of multiple applications generated by a cloud-based software platform and wherein the cloud-based software platform provides a set of services to each of the multiple applications.

11. The method of claim 10, wherein the set of services includes at least one of an administrative service, an application programing interface, and a security services.

12. The method of claim 7, wherein the transaction is being created in a client session hosted by one or more servers in a stateless manner.

13. The method of claim 7, further comprising identifying a set of business rules associated with the transaction.

14. The method of claim 7, wherein generating the transient record comprises linking the activity snapshot to the transaction record and associating the workflow state to a set of business rules.

15. One or more non-transitory computer-readable storage media having program instructions stored thereon, wherein the program instructions, when read and executed by one or more processors, direct the one or more processors to at least:
 receive an activity snapshot from an application running on a client device, wherein the application monitors transaction activity on the client device and generates activity snapshots of the transaction activity in response to triggering events;
 assign a transaction identifier to the activity snapshot identifying a transaction to which the activity snapshot relates;
 associate the activity snapshot with a workflow state of the transaction using business logic; and p1 generate a transient record that links the activity snapshot and the workflow state to the transaction;
 wherein the triggering events include one or more of an expiration of a time interval, a logical transaction boundary, a metadata defined trigger point, and a metadata boundary.

16. The one or more non-transitory computer-readable storage media of claim 15, wherein the program instructions, when read and executed by the one or more processors, further direct the one or more processors to:
 receive a request to restore the transaction to a previous state; and
 process the activity snapshots associated with the transient record; and
 return the transaction to the previous state from a present state.

17. The one or more non-transitory computer-readable storage media of claim 16, wherein the program instructions, when read and executed by the one or more processors, further direct the one or more processors to monitor the transaction and identify a transaction boundary.

18. The one or more non-transitory computer-readable storage media of claim 15, wherein the activity snapshot identifies a user of the application and a client session.

* * * * *

UNITED STATES PATENT AND TRADEMARK OFFICE
CERTIFICATE OF CORRECTION

PATENT NO. : 10,922,307 B2  
APPLICATION NO. : 15/949397  
DATED : February 16, 2021  
INVENTOR(S) : Axel Allgeier et al.

Page 1 of 1

It is certified that error appears in the above-identified patent and that said Letters Patent is hereby corrected as shown below:

In the Claims

Column 16, Claim 15, Line 32, delete "p1"

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*